Dec. 15, 1970  R. W. SEBASTIAN  3,548,166
COUNTDOWN COUNTER CONTROL ASSEMBLY
Filed May 3, 1967  2 Sheets-Sheet 1
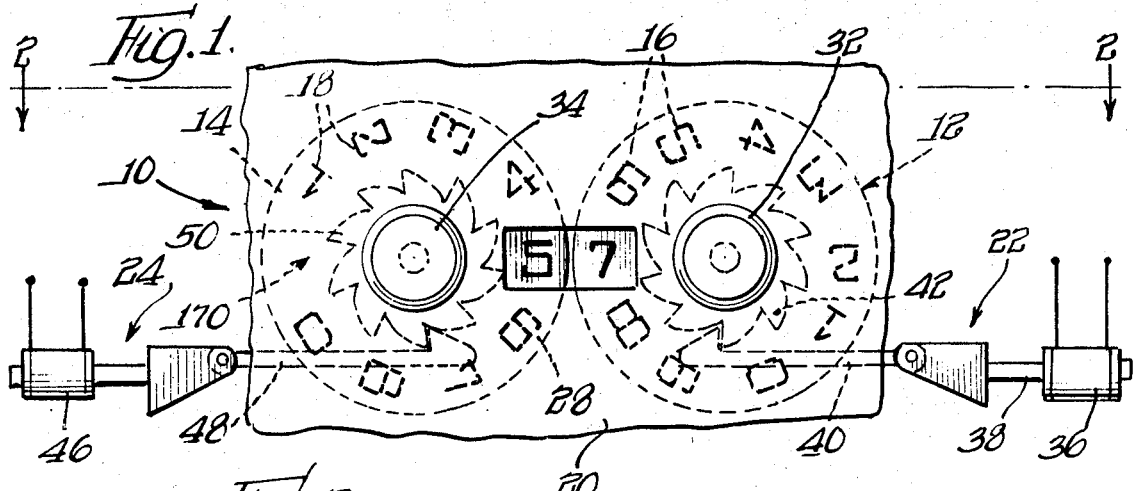
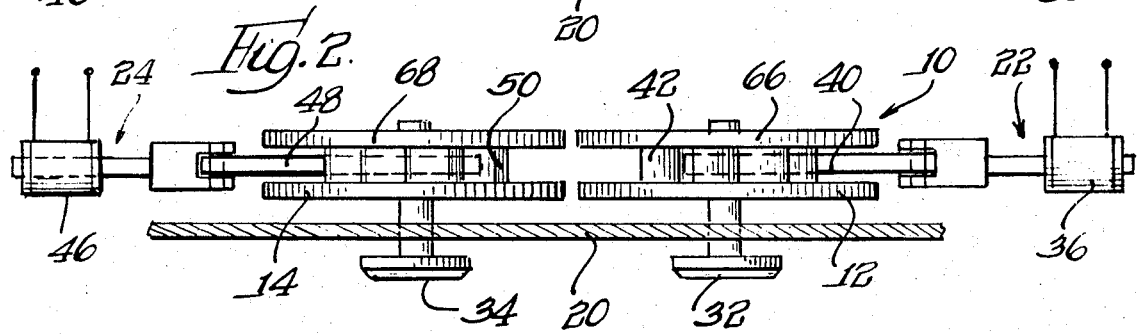
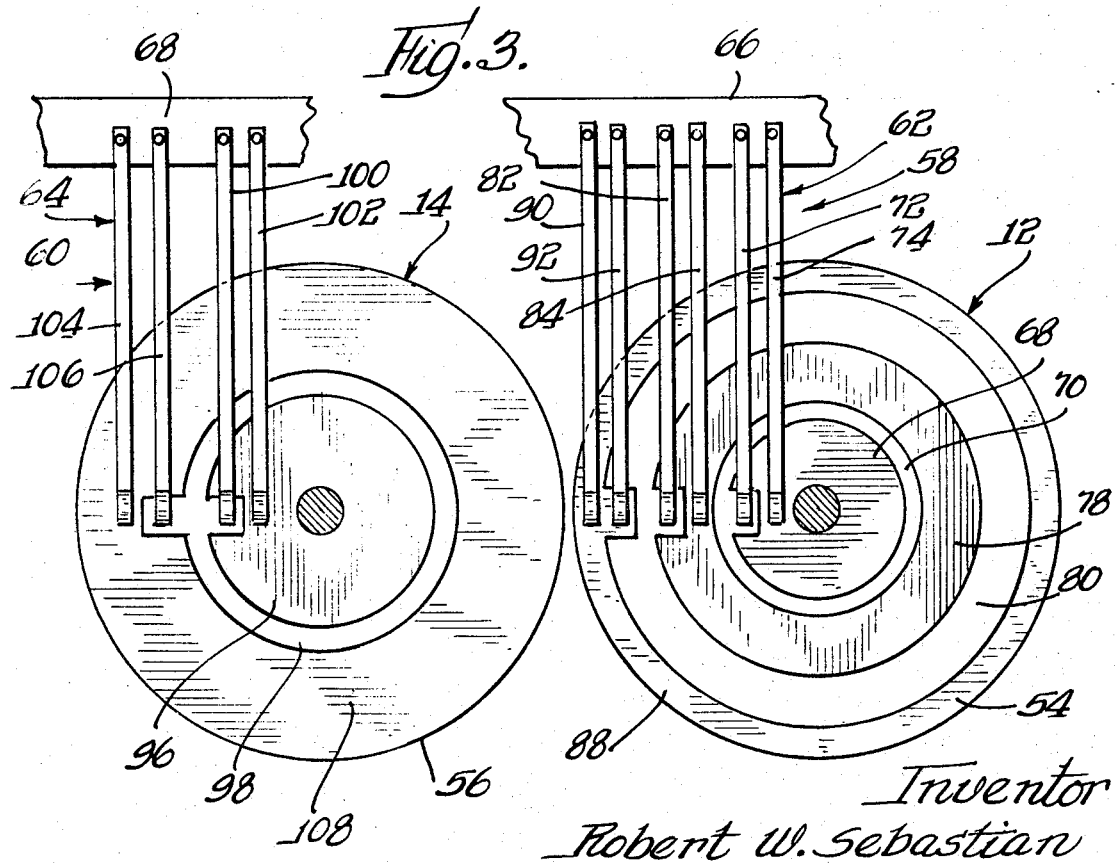
Inventor
Robert W. Sebastian
By: Olson, Trexler, Wolters & Bushnell attys.

Dec. 15, 1970    R. W. SEBASTIAN    3,548,166
COUNTDOWN COUNTER CONTROL ASSEMBLY
Filed May 3, 1967    2 Sheets-Sheet 1

Inventor
Robert W. Sebastian
By: Olson, Trexler, Wolters & Bushnell attys.

United States Patent Office 3,548,166
Patented Dec. 15, 1970

3,548,166
COUNTDOWN COUNTER CONTROL ASSEMBLY
Robert W. Sebastian, Villa Park, Ill., assignor to Molex Products Company, Downers Grove, Ill., a corporation of Illinois
Filed May 3, 1967, Ser. No. 635,780
Int. Cl. G06m 1/27
U.S. Cl. 235—92
4 Claims

ABSTRACT OF THE DISCLOSURE

A countdown counter control assembly having two manually settable control members corresponding to units and tens. (Additional members can be provided for 100, etc.) Each control member is provided with conductive areas and pairs of contacts engageable with the conductive areas to complete circuits for electromagnetically advancing the units member towards zero upon closure of a counter switch, and for advancing the tens member towards zero when the units member reaches a base position. The control members and contacts engageable therewith conjointly operate a machine control to terminate machine operation when both members reach zero position.

DISCLOSURE

Many machines are controlled by counter mechanisms which automatically shut down and turn off the machines after a predetermined number of elements have been processed by the machine. These prior art counter mechanisms are usually relatively complex and include a relatively large number of components. Due to their complexity, the prior art counter mechanisms are expensive to manufacture and are subject to frequent failure during use. Since a failure of the counter mechanism usually disables the machine with which the counter mechanism is associated, it is important that a counter mechanism used to control a machine be reliable in operation in order to avoid costly and unnecessary machine idle or down time.

Therefore, it is an object of this invention to provide a counter assembly which overcomes the aforementioned shortcomings of prior art structures. Specifically, it is an object of this invention to provide an inexpensive, durable counter assembly for controlling the operation of a machine.

Another object of this invention is to provide a positive acting counter mechanism for controlling the operation of a machine as a function of the number of elements processed by the machine.

These and other objects and features of the invention will become more apparent upon a reading of the following detailed description taken in connection with the accompanying drawings wherein:

FIG. 1 is a partially broken away plan view of a display panel on which indicator or counter discs or members are mounted for indicating the number of elements to be processed before a predetermined number of elements have been processed by a machine associated with the display panel;

FIG. 2 is a view of the display panel taken along the line 2—2 of FIG. 1 further illustrating the relationship of the indicator discs to the display panel;

FIG. 3 is an enlarged plan view of contact members which are mounted in sensible engagement with the indicator discs for sensing when the indicator discs are in a predetermined or zero position, both of the indicator discs being shown in the predetermined position in FIG. 3;

Figure 4:
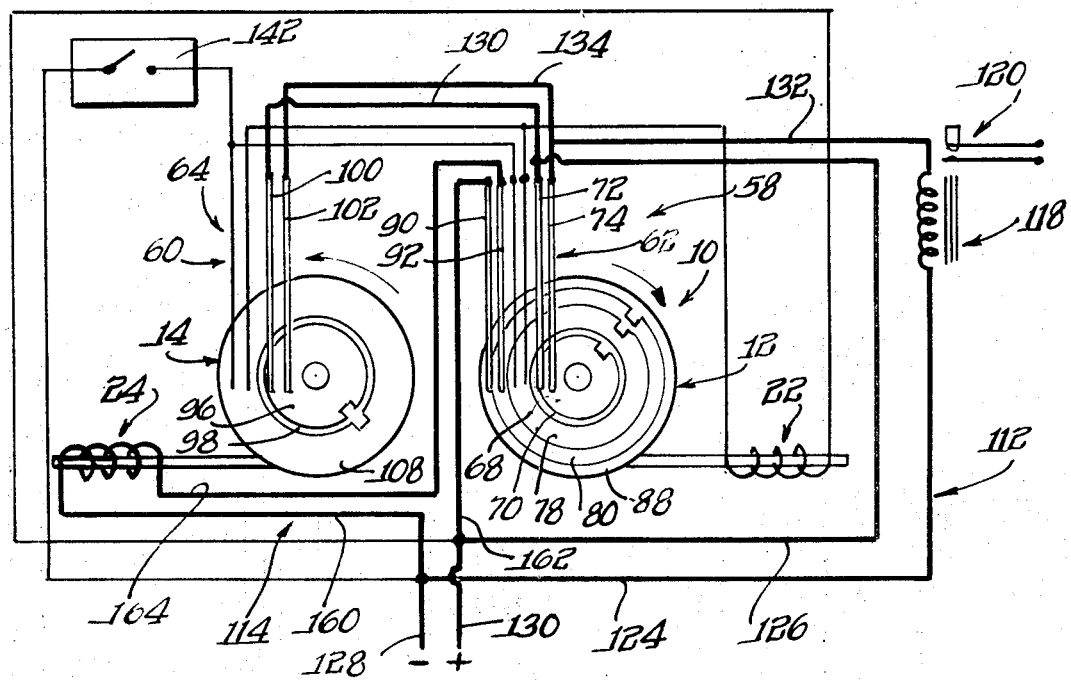
Figure 5:
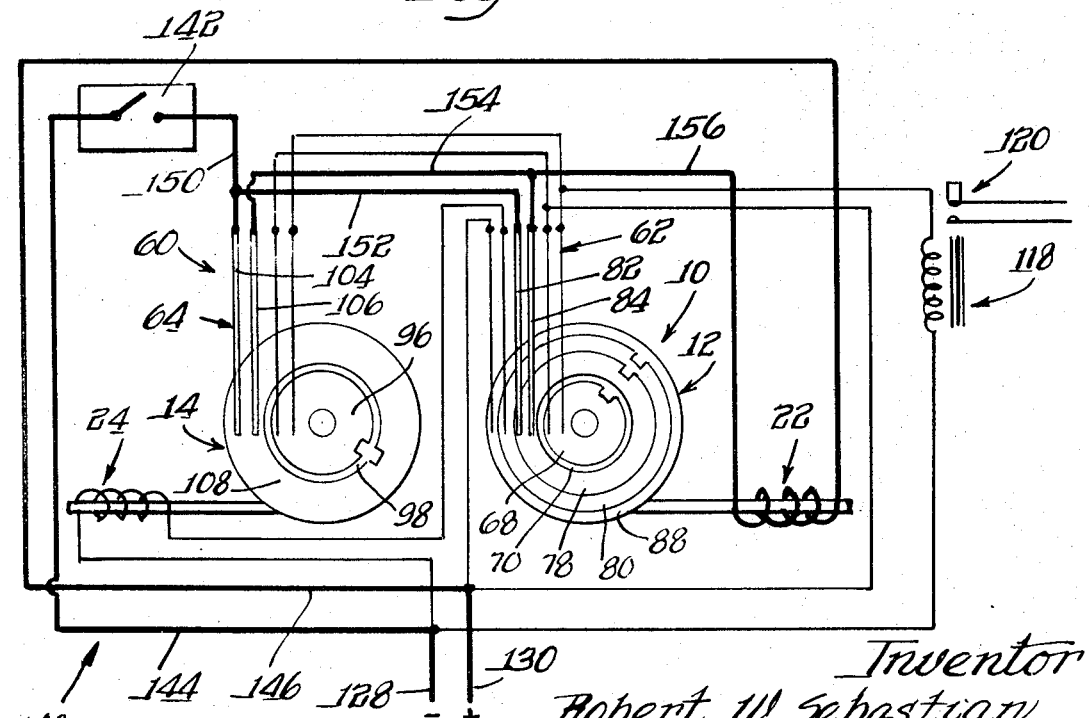

FIG. 4 is a schematic illustration of an exemplary installation wherein the indicator discs of FIG. 1 are used to control thet operation of a machine to disable the machine when the indicator discs reach the predetermined position of FIG. 3, a machine control circuit and a tens transfer circuit being emphasized for purposes of clarity of illustration; and FIG. 5 is a schematic illustration, similar to FIG. 4, in which a circuit for operating a units indicator disc is emphasized for clarity of illustration.

Referring now to the drawings in greater detail, an electrical counter or indicator assembly 10 is illustrated in FIG. 1. The indicator assembly 10 includes a rotatable units indicator disc or member 12 and a rotatable tens indicator disc or member 14. The indicator discs 12 and 14 are generally circular in cross-section and have numerical indicia 16 and 18 formed on flat radially extending front surfaces which are generally parallel to a display panel 20. The indicator discs 12 and 14 are rotatable relative to the display panel 20 by a units drive assembly 22 and a tens drive assembly 24. When the indicator discs 12 and 14 are rotated by their respective drive assemblies, the indicia 16 and 18, which are visible through a window or aperture 28, in the display panel, are changed to indicate a change in the relative positions of the indicator discs 12 and 14.

The indicator assembly 10 is advantageously of the predetermined counter type and includes a pair of knobs or handles 32 and 34 for rotating the indicator discs 12 and 14 relative to the aperture 28 to bring preselected indicia 16 and 18 into view in the aperture to set the indicator assembly for a predetermined number. The drive assemblies 22 and 24 are then sequentially energized or actuated to rotate the indicator disc 12 in a counter-clockwise direction and the indicator disc 14 in a clockwise direction until the indicator discs are at a predetermined or zero position. When the indicator discs 12 and 14 are at the predetermined or zero position the numerals zero ond both discs are aligned with the aperture 28.

The indicator disc 12 is rotated relative to the display panel 20 by energizing a solenoid 36 to attract a core or armature 38 to move a pawl 40 toward the solenoid from the position shown in FIG. 1. As the pawl 40 is moved toward the solenoid, a toothed ratchet or gear drive wheel 42 is rotated in a known manner. The ratchet 42 is fixedly connected to the indicator disc 12 so that they are rotated as a unit relative to the display panel 20 by the drive assembly 22. It is contemplated that a suitable detent arrangement will be used with the ratchet wheel 42 to enable the ratchet wheel to be rotated in only a counterclockwise direction by the drive assembly 22. Since many different types of detent assemblies are known to those skilled in the art and since the detent assembly does not constitute a novel part of the present invention, the detent assembly has not been shown.

The drive assembly 24 is generally similar to the drive assembly 22 and includes a solenoid 46 for moving a pawl 48 which engages a ratchet wheel 50 connected to the indicator disc 14. In view of the foregoing remarks, it is apparent that the indicator assembly 10 includes a plurality of rotatable indicator discs 12 and 14 which are moved or rotated by drive assemblies 22 and 24 relative to an indicator panel 20 until the indicator discs 12 and 14 reach a predetermined zero position.

Turning now to a consideration of FIG. 3, taken in connection with FIG. 2, the indicator discs 12 and 14 have radially extending circular rear surfaces 54 and 56, respectively, which are engaged by sensor assemblies 58 and 60. The sensor assemblies 58 and 60 include a plurality of contacts 62 and 64 which are mounted on suitable support members 66 and 68 at the rear of the indicator panel 20. The radial surface 54 of the indicator disc 12 is separated into a plurality of sections of electrically conductive material and electrically insulating material which are sensibly engaged by the contacts 62. A generally circular radially innermost section of conductive material 68 is defined by a generally annular ring 70 of electrically insulative material. The electrically conductive section 68 and electrically insulative section 70 are slidably engaged by a first pair of sensor contacts 72 and 74 of a machine control circuit. When the indicator disc 12 is in the predetermined zero position, with the numeral zero of the indicia 16 aligned with the aperture 28, the contact 72 engages the electrically insulative section 70 while the contact 72 engages the electrically conductive section 68 as shown in FIG. 3. When the indicator disc 12 is rotated or moved to a position other than the predetermined position, both of the sensor contacts 72 and 74 engage the electrically conductive section 68 to complete a continuous electrical circuit between the two contacts. Thus, when the indicator disc 12 is in the predetermined zero position of FIG. 3 an electrical circuit between the contacts 72 and 74 is broken to at least partially disable a machine control circuit in a manner to be explained in greater detail subsequently.

The radially extending surface 54 also includes a second set of electrically conductive and insulative sections 78 and 80 which are positioned radially outwardly of the sections 68 and 70. The sections 78 and 80 are slidably engaged by sensor contacts 82 and 84 of an actuator circuit for the units drive assembly 22. When the indicator disc 12 is in the zero position shown in FIG. 3, the contact 82 engages the electrically insulative section 80 while the contact 84 engages the electrically conductive section 78 to open the actuator circuit for the units drive assembly 22. When the indicator disc 12 is rotated to a position other than the zero position, both of the contacts 82 and 84 engage the generally annular section 78 of conductive material, to complete a circuit between the contacts 82 and 84. Finally, the radially extending surface 54 includes a radially outer section 88 of electrically conductive material which is slidably engaged by both sensor contacts 90 and 92 of a tens transfer circuit when the indicator disc 12 is in the predetermined zero position of FIG. 3, to complete a circuit between the contacts 90 and 92. When units indicator disc 12 is rotated to a position other than the zero position of FIG. 3, the contact 92 is positioned in engagement with the section 80 of electrically insulative material to open or interrupt the circuit between the contacts 90 and 92.

The radially extending surface 56 of the tens indicator disc 14 is generally similar in structure to the radially extending surface 54 of the units indicator disc 12. The indicator disc 14 includes a generally circular inner section 96 of electrically conductive material which is defined by a generally annular ring of electrically insulative material 98. A pair of sensor contacts 100 and 102 are mounted for sliding engagement with the electrically conductive section 96 when the indicator disc 14 is in a position other than the zero position of FIG. 3. When the indicator disc 14 is in the zero position, the numeral zero of the indicia 18 is aligned with the aperture 28 and the contact 100 engages the electrically insulative section 98 to open an electrical circuit between the contacts 100 and 102. Similarly, a pair of contacts 104 and 106 are associated with a radially outermost electrically conductive section 108 and the electrically insulative section 98. The contact 106 engages the electrically insulative section 98 only when the indicator disc is in the zero position of FIG. 3. When the indicator disc 14 is rotated to a position other than the zero position, both of the contacts 104 and 106 engage the electrically conductive section 108 to complete a circuit between these contacts.

The electrically conductive and electrically insulative sections of the surfaces 54 and 56 are formed in a preferred embodiment of the invention by mounting layers of copper on an electrically insulative base of a phenolic resin board in much the same manner as in which the printed circuits are fabricated. In the preferred embodiment of the invention, generally annular sections of insulating material are used. These generally annular sections of insulating material have radially projecting tongues or tab sections which are engaged by associated sensor contacts when the indicator discs 12 and 14 are in the zero position. It is contemplated that the radially extending surface 56 could, if desired, be formed mainly of electrically conductive material having small sections of electrically insulative material which are engaged by the sensor contacts 62 and 64 when the indicator discs are in the zero position. However, it should be noted, that a generally annular section of insulative material must be associated with the contact 92 so that the contact 92 engages a section of electrically conductive material only when the indicator disc 12 is in the zero position.

By way of example, the indicator assembly 10 can advantageously be used to control the operation of a machine for reproducing a predetermined number of copies or reproductions of printed material, as shown schematically in FIGS. 4 and 5. (This could equally well be control of the number of pieces produced on a punch press etc.) Referring now to FIG. 4, a machine control circuit 112 and a tent transfer circuit 114 are emphasized by heavy black lines for purposes of clarity of illustration. The machine control circuit 112 includes a relay 118 having normally open "on-off" contacts 120 for controlling the operation of the reproduction machine. When the relay 118 is energized, the normally open contacts 120 are closed to complete a circuit, not shown, for operating the reproduction machine. When the relay 118 is released or deenergized, the contacts 120 open and the machine is turned off or shut down.

The machine control circuit 112 includes first or power input lines 124 and 126 which are connected to power mains 128 and 130. The line or lead 124 is connected directly to the coil of the relay 118. The line 126 is connected to the contact 72 of the sensor unit 58 and is connected to the contact 100 of the sensor unit 60 by a lead 130. The coil 118 is connected by a lead 132 to the contact 74 of the sensor unit 58 and by a lead 134 to a contact 102 of the sensor unit 60. When the indicator discs 12 and 14 are in a position other than the zero position, as shown in FIG. 4, the electrically conductive section 68 of the indicator disc 12 completes a circuit between the contacts 72 and 74 and the electrically conductive section 96 of the indicator disc 14 completes a circuit between the contacts 100 and 102. From a consideration of FIG. 4, it is apparent that a circuit between either set of contacts, that is the contacts 72 and 74 of the sensor unit 58 or the contacts 100 and 102 of the sensor unit 60, is sufficient to provide a complete electrical circuit for energizing the relay 118 and holding contacts 120 in a closed position to energize the reproduction machine.

When the indicator discs 12 and 14 are set for a predetermined number of copies from the machine, for example fifty-seven as shown in FIGS. 1, 4 and 5, the indicator disc 12 will be rotated by a drive assembly 22 to the initial or zero position a plurality of times, in the example given five times. Each time the indicator disc is rotated to zero position the contact 72 will engage the electrically insulative section 70 (see FIG. 3) to interrupt the circuit between the contacts 72 and 74. However, the relay 118 is maintained in an energized condition until the indicator disc 14 is moved to the zero position by electrical energy conducted through a circuit including the contacts 100 and 102 of the sensor unit 60. When the indicator discs 12 and 14 are both rotated to the zero position, as shown in FIG. 3, the contact 100 engages the insulative section 98 and the contact 72 engages the insulative section 70 to deenergize or release the relay 118. When the relay 118 is released, the contacts 120 are opened and the machine is turned off. It is contemplated that when the machine is turned off the power mains 128 and 130 will be disconnected from a source of power.

An actuator circuit 140 for the units drive assembly 22 as shown in FIG. 5. The units drive assembly 22 is energized by electrical energy conducted through the actuator circuit 140 whenever a normally open sensor or counter switch 142 is closed. When the indicator assembly 10 is used with a reproduction machine, it is contemplated that the sensor switch 142 will be closed by either engagement with a piece of paper upon which a reproduction of an original has been formed or by a suitable cam connected to a drive member of the reproduction machine. It will be appreciated by those skilled in the art that the switch 142 can be actuated in many different ways to count the number of copies or reproductions made by the machine with which the indicator assembly 10 is associated.

The actuator circuit 140 includes a pair of leads 144 and 146 which are connected directly to the power mains 128 and 130. The lead 144 extends between the power main 128 and the sensor switch 142. The lead 146 connects the drive assembly 22 to the power main 130. The switch 142 is in turn connected to the drive assembly 22 through contacts of the sensor units 58 and 60. Thus, the sensor switch 142 is connected by a lead 150 to the contact 104 of the sensor unit 60 and by a lead 152 to the contact 82 of the sensor unit 58. The contacts 104 and 106 of the sensor units 58 and 60 are interconnected by a lead 154 which is in turn connected to the drive assembly 22 by a lead 156.

In view of the foregoing circuit description, it is apparent that the drive assembly 22 is energized when the indicator discs 12 and 14 are in a position other than the zero position by electrical energy conducted through the contacts 82 and 84 of the sensor unit 58 or the contacts 104 and 106 of the sensor unit 60 each time the sensor switch 142 is closed. When the indicator discs 12 and 14 are set for a predetermined number of copies, such as fifty-seven as illustrated in FIGS. 1, 4 and 5, the contacts 104 and 106 engage the electrically conductive section 108 of the indicator disc 14 and the contacts 82 and 84 engage the electrically conductive section 78 of the indicator disc 12 (see FIG. 5), to enable the drive assembly 22 to be energized each time the switch 142 is closed to step the units indicator disc 12 to the zero position. The first time the indicator disc 12 is stepped to the zero position, after only seven copies have been made in the example given, and the numeral 50 appears in the aperture 28, the contact 82 engages the electrically insulative section 80 to interrupt the circuit between the contacts 82 and 84. However, the circuit for energizing the drive assembly 22 is maintained by a circuit including the contacts 104 and 106 of the sensor unit 60. Both of the contacts 104 and 106 are then in engagement with the electrically conductive section 108 of the indicator disc 14 to complete a circuit, including the leads 150, 154 and 156, for energizing the drive assembly 22. When both of the indicator discs 12 and 14 have been stepped to the zero position by the drive assemblies 22 and 24, the circuit between the contacts 104 and 106 is interrupted by the electrically insulative section 98 and the circuit between the contacts 82 and 84 is interrupted by the electrically insulative section 80 to disable the drive assemblies 22 and 24 against further rotation of the indicator discs 12 and 14.

Returning once again to a consideration of FIG. 4, the tens transfer circuit 114 is connected to the power main 128 by a lead 160 which extends between the power main 128 and the drive assembly 24. The tens transfer circuit 114 also includes a lead 162 which connects the contact 90 of the sensor unit 58 to the power main 130. The contact 92 of the sensor unit 58 is connected to the drive assembly 24 by a lead 164. Whenever an electrical circuit is completed between the contacts 90 and 92 of the sensor unit 58 the tens transfer circuit 114 is completed to energize the drive assembly 24 and step the tens indicator disc 14 one step or position. As perhaps can be seen best in FIG. 3, an electrical circuit is completed between the contacts 90 and 92 by the electrically conductive sections 88 each time the units indicator disc 12 is stepped or moved to the zero position. Thus, the tens indicator disc 14 is moved one position on each complete revolution of the indicator disc 12 by electrical energy conducted between the contacts 90 and 92 of the sensor unit 58. In the example given wherein the indicator assembly 10 is set for fifty-seven copies, the indicator disc 12 passes through the zero position five times before the indicator disc 14 is stepped to the zero position to interrupt the circuit between the leads 104 and 106 (see FIGS. 3 and 5). When both the indicator discs 12 and 14 have been stepped to the zero position, the drive assembly 22 is effectively disabled by the sensor units 58 and 60 against further moving the units indicator disc 12. The drive assembly 22 is disabled from moving the units indicator 12 past the zero position when the tens indicator disc 14 is in the zero position since the actuator circuit 140 (see FIG. 5) is interrupted by the engagement of the contact 82 of the sensor unit 58 with the electrically insulative section 80 and the engagement of the contact 106 with the electrically insulative section 98, so that an electrical circuit cannot be completed for energizing the coil 36 of the drive assembly 22 (see FIGS. 1 and 3).

For purposes of affording a more complete understanding of the invention, it is advantageous now to provide a functional description of the mode in which the component parts cooperate. When the counter unit 10 is set for a predetermined number of cycles, in the example given fifty-seven copies or reproductions, by rotating the knobs 32 and 34, a machine control circuit 112 will be energized to operate the relay 118 and close contacts 120 to start the reproduction machine. The circuit over which the relay 118 will be energized includes sensor contacts 72 and 74, which will be located in engagement with the electrically conductive section 68 of the units indicator disc 12, and contacts 100 and 102, which will be located in engagement with the electrically conductive section 96 of the tens indicator disc 14. As copies or reproductions of an original are produced by the machine, the switch 142 will be closed to energize the actuator circuit 140 for the units drive assembly 22. This actuator circuit for the units drive assembly 22 will include the contacts 82 and 84 which will be located in engagement with the electrically conductive section 78 of the units indicator disc 12 and the contacts 104 and 106 which will be located in engagement with the electrically conductive section 108 of the tens indicator disc 14.

Each time the sensor switch 142 is closed, the units drive assembly 22 will be energized to step the units disc 12 one position. After seven copies have been produced by the machine and the switch 142 closed seven times, the units indicator disc 12 will have been moved to the zero position with the numeral zero showing at the aperture 28. However, the tens indicator disc 14 will still be offset from the zero position with the numeral five showing at the aperture 28. When the indicator discs 12 and 14 are so positioned, the drive assembly 22 will be energized over a circuit including the contacts 104 and 106 of the sensor unit 60 and the leads 150 and 154 when the next copy is produced. The tens indicator disc 14 will be stepped one position by the drive assembly 24 which will be energized over a circuit including the contacts 90 and 92 of the sensor unit 58 and the electrically conductive section 88. Of course, each time the units indicator disc 12 is moved to the zero position, the drive assembly 24 will be energized over a circuit including the contacts 90 and 92 of the sensor unit 58 and the electrically conductive section 88.

After forty-seven copies have been made, the indicator discs 12 and 14 will have been moved to show numerals indicating that ten copies remain to be made. The indicator disc 14 will then be stepped to move a blank area, indicated at 170 in FIG. 1, into alignment with the aperture 28 and the drive assembly 22 will be energized as the succeeding nine copies are made. When the last or fifty-seventh copy is made the indicator disc 12 will be stepped to position a zero in alignment with the aperture 28. The drive assembly 24 will then be energized for a last time by electrical energy conducted over a circuit including the contacts 90 and 92 to step the tens indicator disc 14 to the zero position in which the indicator discs 12 and 14 are both positioned with the numeral zero in alignment with the aperture 28. As the numeral zero on the indicator disc 14 is moved into alignment with the aperture 28, the machine control circuit 112 will be interrupted by engagement of the contact 100 with the electrically insulative section 98 (see FIG. 3) of the indicator disc 14 to shut off the reproduction or copy machine. It should be noted that when the machine is shut off, the power mains 128 and 130 are disconnected from a source of power so that the drive assembly 24 is deenergized.

While the indicator assembly 10 has been disclosed as controlling the operation of a reproduction or copy machine, it will be apparent that the indicator assembly can be used for controlling many other machines and processes. To control a given machine or process it is merely necessary to have the switch 142 actuated each time a cycle of operation of the machine occurs so that the indicator assembly 10 will shut down the machine at the end of a predetermined number of cycles. Of course, the capacity of the indicator assembly 10 can be increased by increasing the number of rotatable indicator members and the number of tens transfer circuits. It is also contemplated that the electrically insulated and conductive sections can be formed on a peripheral surface of a cylindrical indicator member rather than a radial surface of a circulator indicator disc or member. It is contemplated that the indicator assembly will be used by those skilled in the art as a counter for applications other than controlling machines. Therefore, while particular embodiments of the invention have been shown, it should be understood, of course, that the invention is not limited thereto since many modifications may be made; and it is contemplated to cover by the appended claims any such modifications as fall within the true spirit and scope of the invention.

What is claimed is:

1. An electrical counter assembly comprising: first and second rotatable members for displaying indicia; first drive means mounted adjacent to said first rotatable member for rotating said first rotatable member; second drive means mounted adjacent to said second rotatable member for rotating said second rotatable member; first and second sensor means mounted in engagement with said first rotatable member for sensing when said first rotatable member is in a predetermined position; third sensor means mounted in engagement with said second rotatable member for sensing when said second rotatable member is in a predetermined position; first electrical circuitry interconnecting said first drive means and said first and third sensor means, said first electrical circuitry including a switch operable to energize said first drive means to rotate said first rotatable member, said first drive means being disabled by said first and third sensor means when both said first and second rotatable members are in their predetermined positions; and second electrical circuitry interconnecting said second sensor means and said second drive means ot energize said second drive means to rotate said second rotatable member toward the predetermined position for said second rotatable member when said first rotatable member is in the predetermined position for said first rotatable member; fourth sensor means mounted in engagement with said first rotatable member for sensing when said first rotatable member is in the predetermined position for said first rotatable member; fifth sensor means mounted in engagement with said second rotatable member for sensing when said second rotatable member is in the predetermined position for said second rotatable member; and third electrical circuitry connecting said fourth and fifth sensor means to a control switch means for at least partially controlling the operation of a machine, said control switch means being operated from a first position to a second position to at least partially disable the machine against further operation when said fourth and fifth sensor means sense that said first and second rotatable members are in their respective predetermined positions.

2. An electrical counter assembly comprising: first and second rotatable members for displaying indicia; first drive means mounted adjacent to said first rotatable member for rotating said first rotatable member; second drive means mounted adjacent to said second rotatable member for rotating said second rotatable member; first electrical circuitry connected to said first drive means, said first electrical circuitry including switch means operable for energizing said first drive means to rotate said first rotatable member; first sensor means mounted in sensible engagement with said first rotatable member for sensing when said first rotatable member is in a predetermined position; second electrical circuitry connected to said sensor means and said second drive means, said second electrical circuitry and said second drive means being energized to move said rotatable member when said sensor means senses that said first rotatable member is in the predetermined position; said first rotatable member having three arcuate conductive areas thereon, two of said conductive areas each having an insulating discontinuity thereon, and the third thereof having an additional conductive area corresponding to said insulating area; said first sensor means including three pairs of contact members, two of said pairs engaging a respective one of said conductive areas and one contact of each of said two pairs being positioned to engage the insulating discontinuity thereof, the third pair engaging the third conductive area and an adjacent insulating area and being positioned to engage said additional contact area; said second rotatable member having two arcuate conductive areas thereon, each having an insulating discontinuity therein; and second sensor means mounted in sensible engagement with said second rotatable member and comprising two pairs of contact members engaging said conductive areas, one of each pair of contact members of said second sensor means being positioned to engage the insulating discontinuity therein; said second sensor means being connected to said second electric circuitry.

3. A counter assembly as set forth in claim 2 wherein one pair of the first sensor means contacts is connected in parallel with one pair of said second sensor means contacts.

4. A counter assembly as set forth in claim 2 and further including control relay means connected to certain of the contacts of the first and second sensor means and energized until all insulating discontinuities are engaged by the respective contacts.

References Cited

UNITED STATES PATENTS

| | | | |
|---|---|---|---|
| 1,774,762 | 9/1930 | Roesen | 235—92 |
| 2,737,650 | 3/1956 | Bush et al. | 340—379 |
| 2,984,413 | 5/1961 | Renshaw et al. | 235—92 |
| 3,078,655 | 2/1963 | Hickly | 58—26 |
| 3,429,258 | 2/1969 | Baranoff et al. | 101—79 |

MAYNARD R. WILBUR, Primary Examiner

J. M. THESZ, Assistant Examiner

U.S. Cl. X.R.

340—379